United States Patent
Madey

(10) Patent No.: US 11,608,163 B2
(45) Date of Patent: Mar. 21, 2023

(54) REBOUND VALVE SYSTEMS AND METHODS

(71) Applicant: GOODRICH CORPORATION, Charlotte, NC (US)

(72) Inventor: Kyle M. Madey, Broadview Heights, OH (US)

(73) Assignee: Goodrich Corporation, Charlotte, NC (US)

( * ) Notice: Subject to any disclaimer, the term of this patent is extended or adjusted under 35 U.S.C. 154(b) by 252 days.

(21) Appl. No.: 17/033,081

(22) Filed: Sep. 25, 2020

(65) Prior Publication Data

US 2022/0097833 A1    Mar. 31, 2022

(51) Int. Cl.
   *B64C 25/60*    (2006.01)
   *F16F 9/18*     (2006.01)
   *F16F 9/346*    (2006.01)

(52) U.S. Cl.
   CPC .............. *B64C 25/60* (2013.01); *F16F 9/185* (2013.01); *F16F 9/3465* (2013.01)

(58) Field of Classification Search
   CPC .......... B64C 25/60; F16F 9/3465; F16F 9/185
   See application file for complete search history.

(56) References Cited

U.S. PATENT DOCUMENTS

| 4,552,324 A | 11/1985 | Hrusch |
| 4,787,486 A | 11/1988 | Hrusch et al. |
| 9,061,759 B2 | 6/2015 | Ditzler |
| 2015/0129381 A1 | 5/2015 | Ditzler |

FOREIGN PATENT DOCUMENTS

| EP | 0299588 | | 1/1989 |
| FR | 948387 A | * | 7/1949 |
| FR | 993888 A | * | 11/1951 |
| FR | 2530763 A1 | * | 1/1984 |
| FR | 2687123 | | 8/1993 |

OTHER PUBLICATIONS

European Patent Office; Extended European Search Report dated Mar. 3, 2022 in Application No. 21199161.7.

* cited by examiner

*Primary Examiner* — Melody M Burch
(74) *Attorney, Agent, or Firm* — Snell & Wilmer L.L.P.

(57) ABSTRACT

A snubber assembly may comprise a snubber having a snubber body with an inner diameter surface and an outer diameter surface, the snubber including a plurality of valve receptacles disposed in the outer diameter surface, the snubber including a plurality of radial apertures disposed through the snubber body, each radial aperture in the plurality of radial apertures disposed in a respective valve receptacle in the plurality of valve receptacles; and a plurality of restrictor valves, each restrictor valve in the plurality of restrictor valves disposed in a respective valve receptacle in the plurality of valve receptacles, each restrictor valve in the plurality of restrictor valves including an orifice disposed through a blade.

17 Claims, 12 Drawing Sheets

DETAIL A

SECT B-B

SECT B-B

REBOUND VALVE SYSTEMS AND METHODS

FIELD

The present disclosure relates generally to rebound valve systems and methods. In particular, the present disclosure relates to rebound valve systems and methods for use in a shock strut of a landing gear system.

BACKGROUND

Shock absorbing devices are used in a wide variety of vehicle suspension systems for controlling motion of the vehicle and its tires with respect to the ground and for reducing transmission of transient forces from the ground to the vehicle. Shock absorbing struts are a common component in most aircraft landing gear assemblies. Shock struts control motion of the landing gear, and absorb and damp loads imposed on the gear during landing, taxiing, braking, and takeoff.

A shock strut generally accomplishes these functions by compressing a fluid within a sealed chamber formed by hollow telescoping cylinders. The fluid generally includes both a gas and a liquid, such as hydraulic fluid or oil. One type of shock strut generally utilizes an "air-over-oil" arrangement wherein a trapped volume of gas is compressed as the shock strut is axially compressed, and a volume of oil is metered through an orifice. The gas acts as an energy storage device, similar to a spring, so that upon termination of a compressing force the shock strut returns to its original length. Shock struts also dissipate energy by passing the oil through the orifice so that as the shock absorber is compressed or extended, its rate of motion is limited by the damping action from the interaction of the orifice and the oil.

A rebound valve system for a shock strut generally controls a strut out-stroke velocity to limit a piston bottoming impact load while allowing the extension velocity that is fast enough to maintain tire to ground contact during taxiing.

SUMMARY

A snubber assembly is disclosed herein. The snubber assembly may comprise: a snubber having a snubber body with an inner diameter surface and an outer diameter surface, the snubber including a plurality of valve receptacles disposed in the outer diameter surface, the snubber including a plurality of radial apertures disposed through the snubber body, each radial aperture in the plurality of radial apertures disposed in a respective valve receptacle in the plurality of valve receptacles; and a plurality of restrictor valves, each restrictor valve in the plurality of restrictor valves disposed in a respective valve receptacle in the plurality of valve receptacles, each restrictor valve in the plurality of restrictor valves including an orifice disposed through a blade.

In various embodiments, the snubber assembly may further comprise a retaining ring, wherein the retaining ring couples the plurality of restrictor valves to the snubber body. The plurality of restrictor valves may be configured to pivot about the retaining ring. The snubber assembly may further comprise a plurality of seal valves disposed in a portion of the plurality of valve receptacles, wherein the plurality of restrictor valves are disposed in a remaining portion of the plurality of valve receptacles. The plurality of seal valves may include a first keying feature and the plurality of restrictor valves may include a second keying feature to prevent mis-assembly. Each restrictor valve in the plurality of restrictor valves may include a grip, the blade, and a shaft extending from the grip to the blade. The orifice may be disposed through the blade.

A rebound valve system is disclosed herein. The rebound valve system may comprise: a strut piston defining an oil chamber, the strut piston including a plurality of radial apertures disposed radially through the strut piston; a strut cylinder configured to receive the strut piston, a rebound chamber defined between the strut piston and the strut cylinder; and a plurality of restrictor valves disposed circumferentially around the strut piston, each restrictor valve in the plurality of restrictor valves configured to open during a compression of the strut piston relative to the strut cylinder, and each restrictor valve configured to at least partially close during an extension of the strut piston.

In various embodiments, each restrictor valve in the plurality of restrictor valves includes an orifice disposed through a blade. A fluid may be configured to flow from the rebound chamber through the orifice and a respective radial aperture in the plurality of radial apertures into the oil chamber during the extension of the strut piston. A flow of fluid may be configured to pivot the plurality of restrictor valves about a pivot axis to open the plurality of restrictor valves during the compression of the strut piston. The rebound valve system may further comprise a plurality of seal valves, wherein each seal valve in the plurality of seal valves is configured to seal a respective radial aperture in the plurality of radial apertures during the extension of the strut piston. The rebound valve system may further comprise a snubber disposed between the strut cylinder and the strut piston. The plurality of restrictor valves may be disposed between the snubber and the strut cylinder.

A shock strut assembly is disclosed herein. The shock strut assembly may comprise: a strut cylinder; a strut piston, the strut cylinder configured to receive the strut piston, the strut piston defining an oil chamber; and a snubber assembly disposed between the strut cylinder and the strut piston, the snubber assembly comprising: a snubber having a plurality of valve receptacles disposed in an outer diameter surface of the snubber; and a plurality of restrictor valves, each restrictor valve disposed in a respective valve receptacle in the plurality of valve receptacles, each restrictor valve in the plurality of restrictor valves configured to open during a compression of the strut piston relative to the strut cylinder, and each restrictor valve configured to at least partially close during an extension of the strut piston.

In various embodiments, each restrictor valve includes a grip, a blade, and a shaft extending from the grip to the blade, and each restrictor valve is configured to pivot about the grip. The shock strut assembly may further comprise a plurality of seal valves disposed in a portion of the plurality of valve receptacles, wherein the plurality of restrictor valves are disposed in a remaining portion of the plurality of valve receptacles. The shock strut assembly may further comprise a retaining ring, wherein the plurality of restrictor valves are coupled to the retaining ring, and wherein the retaining ring is coupled to the snubber. The oil chamber may be in fluid communication with a rebound chamber through the plurality of restrictor valves, the rebound chamber defined between the strut piston and the strut cylinder. A flow of fluid may be configured to pivot the plurality of restrictor valves about a pivot axis to open the plurality of restrictor valves during the compression of the strut piston.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

In various embodiments, a rebound valve system for a shock strut assembly is disclosed herein. The rebound valve system may be configured to meter oil to slow down a piston extension in the shock strut assembly, or the like. In this regard, the rebound valve system may be configured to dampen the piston extension. Typical rebound valve systems may include slip rings, which may be difficult to manufacture, and/or may cause issues with assembly of the shock strut assembly. The rebound valve system disclosed herein may include a plurality of restrictor valves disposed circumferentially about a piston and/or a snubber of the shock strut assembly. In various embodiments, the rebound valve system may further comprise a plurality of seal valves. In various embodiments, the plurality of restrictor valves and the plurality of seal valves may be configured to transition from a closed position, or partially closed position, to allow a free flow of oil to a rebound chamber from a hydraulic chamber of the shock strut assembly. In various embodiments, the plurality of restrictor valves may allow metered flow from the rebound chamber to the hydraulic chamber when in a closed position.

Figure 1:
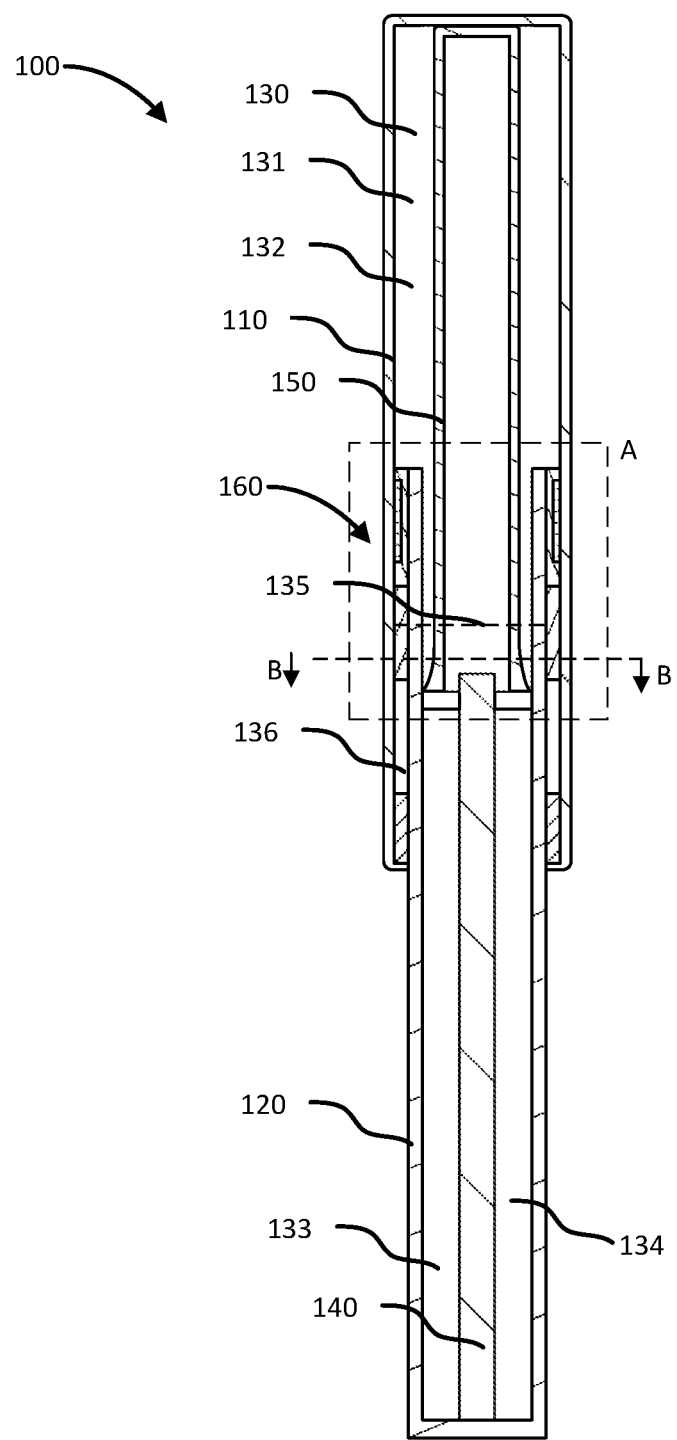
FIG. 1 illustrates a shock strut assembly, in accordance with various embodiments.

Referring now to FIG. 1, a shock strut assembly 100 for use in a landing gear system, in accordance with various embodiments, is illustrated. The shock strut assembly 100 may comprise a strut cylinder 110, a strut piston 120, a metering pin 140, an orifice support tube 150, and a rebound valve system 160. Strut piston 120 may be operatively coupled to strut cylinder 110 as described herein. Strut cylinder 110 may be configured to receive strut piston 120 in a manner that allows the two components to telescope together and absorb and/or dampen forces transmitted thereto. In various embodiments, a liquid, such as a hydraulic fluid and/or oil may be located within strut cylinder 110. A gas, such as nitrogen or air, may also be located within strut cylinder 110. Strut cylinder 110 and strut piston 120 may, for example, be configured to seal such that fluid contained within strut cylinder 110 is prevented from leaking as strut piston 120 translates relative to strut cylinder 110. The metering pin 140 and the orifice support tube 150 may be positioned within primary chamber 130. The metering pin 140 may translate with strut piston 120.

Shock strut assembly 100 may comprise a low pressure, primary chamber 130 in which oil and gas can mix. In this regard, a volume of gas (also referred to herein as a primary chamber gas volume) 131 and a volume of oil (also referred to herein as an oil volume) 133 may be contained within primary chamber 130. A portion of primary chamber 130 may contain the primary chamber gas volume 131 and may be referred to as a primary gas chamber 132. Similarly, the portion of primary chamber 130 containing the oil volume 133 may be referred to herein as an oil chamber 134. Dashed line 135 represents the level of oil volume 133, or the interface between the oil chamber 134 and the primary gas chamber 132. Stated differently, the oil volume 133 may be located below dashed line 135 and primary chamber gas volume 131 may be located above dashed line 135. In this regard, the interface between the oil chamber 134 and the primary gas chamber 132 may move relative to primary chamber 130 depending on the position of strut piston 120 relative to strut cylinder 110.

Shock strut assembly 100 may further comprise rebound chamber 136. The rebound chamber 136 is disposed between the strut cylinder 110 and an outer diameter surface of the strut piston 120. The rebound chamber 136 expands when the strut cylinder 110 is compressed, and the rebound chamber 136 contracts when the strut cylinder 110 extends.

In various embodiments, the rebound valve system 160 is configured to allow free flow into the rebound chamber 136. In various embodiments, the rebound valve system 160 is configured to prevent or minimize cavitation. When the strut piston 120 extends, the rebound valve system 160 is configured to close and oil flow out of the rebound chamber is restricted, or metered, by the rebound valve system 160. In various embodiments, the rebound valve system 160 is configured to control the extend rate and snub the strut piston 120 bottoming force at full extension.

Figure 2:
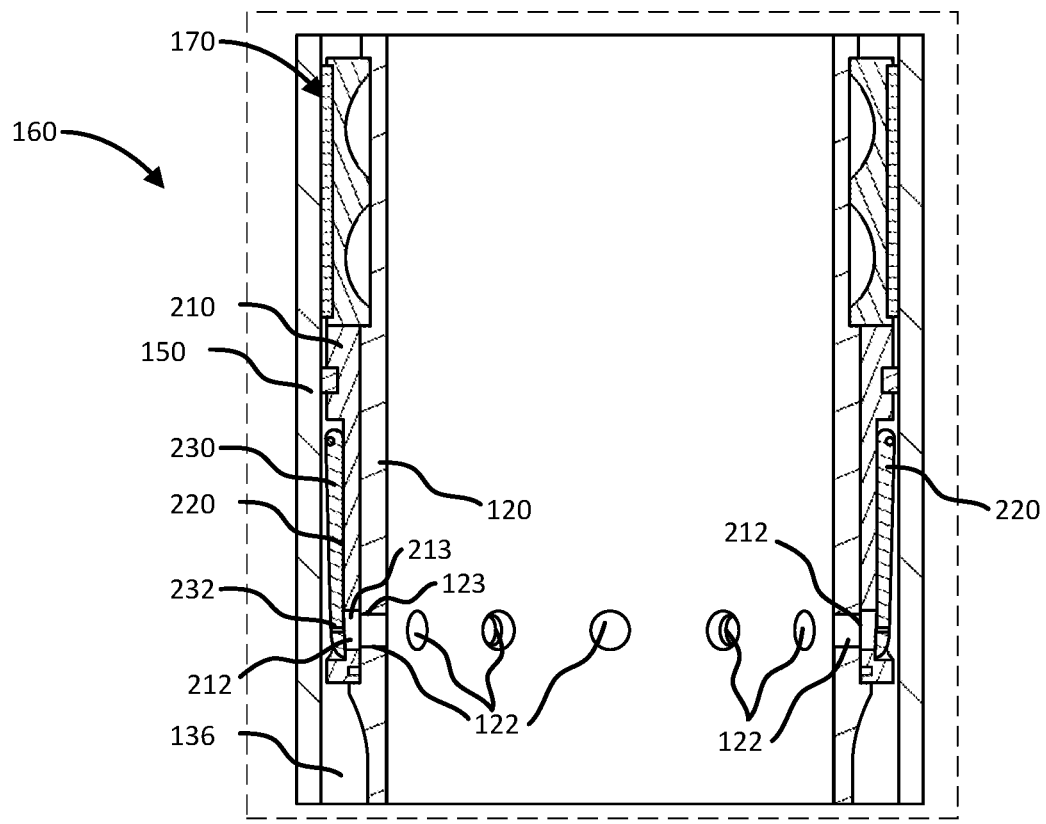
FIG. 2 illustrates a cross-section view of the shock strut assembly of FIG. 1, in accordance with various embodiments.

Referring now to FIG. 2, detail A of shock strut assembly 100 with rebound valve system 160 from FIG. 1, in accordance with various embodiments, is illustrated. In various embodiments, the shock strut assembly 100 further comprises an upper bearing assembly 170. The upper bearing assembly 170 is disposed adjacent to the rebound valve system 160. In various embodiments, the rebound valve system 160 includes the strut piston 120, a snubber 210, and a plurality of restrictor valves 220. In various embodiments, the snubber 210 is disposed radially outward of the strut piston 120, and the plurality restrictor valves 220 are disposed radially outward of the snubber 210. In various embodiments, a rebound valve system 160 may exclude a snubber 210, and the restrictor valves may be operably coupled directly to the strut piston 120. In various embodiments, having the snubber 210 may reduce manufacturing costs of the strut piston 120 and/or simplify assembly of the shock strut assembly 100 from FIG. 1.

In various embodiments, the strut piston 120 comprises a plurality of radial apertures 122, and the snubber 210 comprises a plurality of radial apertures 212. In various embodiments, the plurality of radial apertures 212 of the snubber 210 are aligned radially and axially with the plurality of radial apertures 122 of the strut piston 120. In various embodiments, each radial aperture in the plurality of radial apertures 212 of the snubber 210 may be larger in diameter relative to a respective radial aperture in the plurality of radial apertures 122 of the strut piston. In this regard, the snubber 210 may include looser tolerances for the plurality of radial apertures 212, reducing manufacturing costs and/or facilitating assembly of the shock strut assembly 100 from FIG. 1.

In various embodiments, each restrictor valve in the plurality of restrictor valves 220 comprises an orifice. For example, a restrictor valve 230 in the plurality of restrictor valves 220 comprises an orifice 232. In various embodiments, the orifice 232 may be configured to meter flow from rebound chamber 136 during strut extension.

The rebound chamber 136 and the primary chamber 132 are in fluid communication through the rebound valve system 160. For example, when the plurality of restrictor valves 220 are closed during strut extension, oil disposed in the rebound chamber 136 may flow out rebound chamber 136 through an orifice of a respective restrictor valve, a respective aperture of the snubber 210, and a respective aperture of the strut piston 120. For example, oil may flow through the orifice 232 of the restrictor valve 230, through a first radial aperture 213 in the plurality of radial apertures 212 of the snubber, and through a first radial aperture 123 in the plurality of radial apertures 122 of the strut piston 120 to the primary chamber 132.

In various embodiments, the plurality of restrictor valves 220 are operably coupled to the snubber 210. Although illustrated as being operably coupled to the snubber 210, the plurality of restrictor valves 220 are not limited in this regard. For example, the plurality of restrictor valves 220 may be operably coupled directly to the strut piston 120 in accordance with various embodiments. In various embodiments, the plurality of restrictor valves 220 are pivotably coupled to the snubber 210 as described further herein. Although illustrated as being pivotably coupled to the snubber 210, the plurality of restrictor valves are not limited in this regard. For example, the plurality of restrictor valves 220 may be a loose component disposed between the snubber 210 and the strut cylinder 110. In this regard, the plurality of restrictor valves may translate open and closed based on a pressure differential during extension or compression of the strut cylinder 110. In various embodiments, having the plurality of restrictor valves 220 pivotably coupled to the snubber 210 may provide a more consistent opening and closing motion of the plurality of restrictor valves and provide for ease of assembly of the shock strut assembly 100 in FIG. 1.

In various embodiments, snubber 210 is clocked to the strut piston 120 in order to maintain the radial flow paths through the plurality of radial apertures 122 and the plurality of radial apertures 212. In various embodiments, this clocking may be achieved by any known method known in the art.

Figure 3:
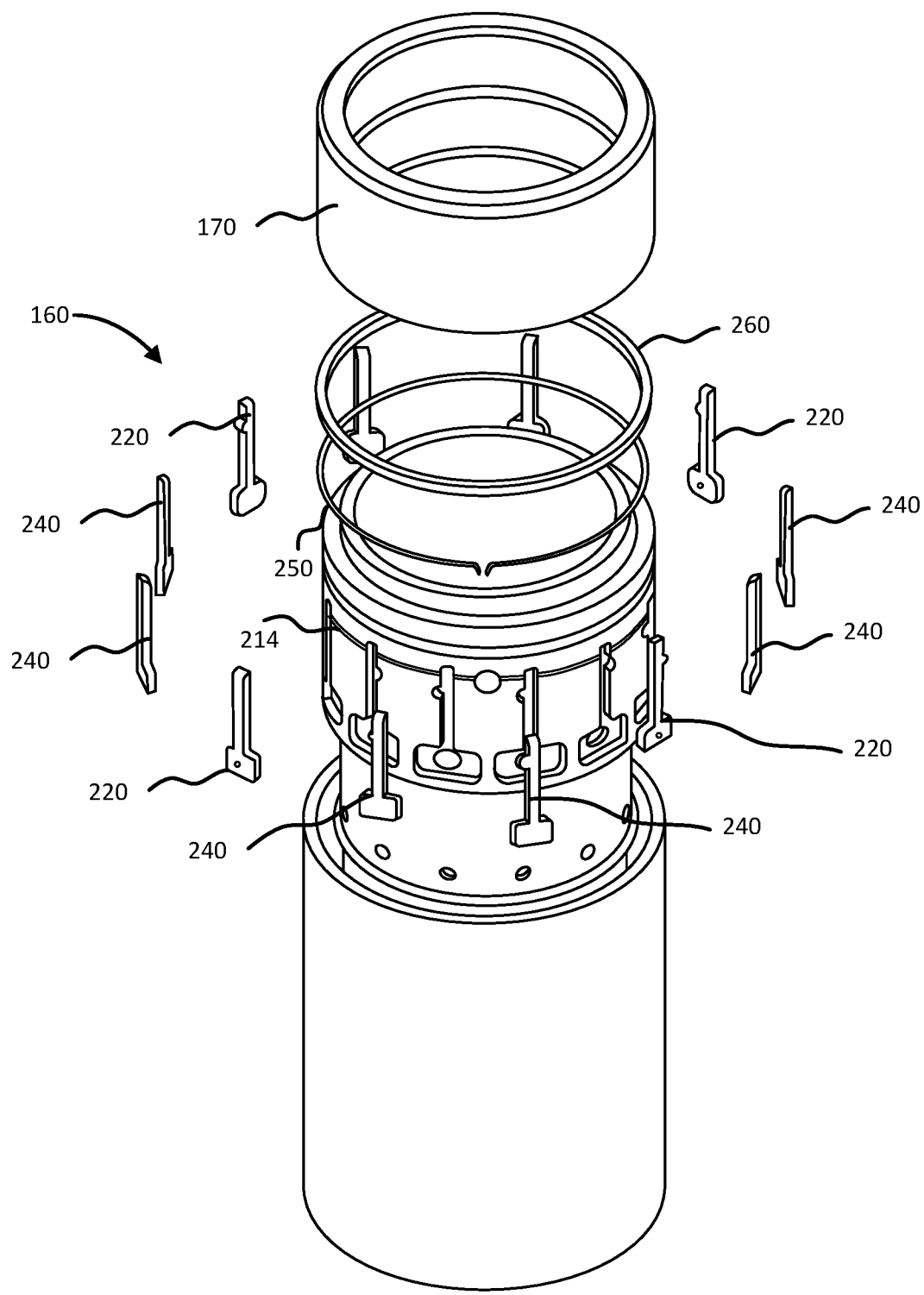
FIG. 3 illustrates an exploded view of a rebound valve system, in accordance with various embodiments.

Referring now to FIG. 3, an exploded view of a portion of a shock strut assembly 100 with a rebound valve system 160, in accordance with various embodiments, is illustrated. In various embodiments, the rebound valve system 160 may further comprise a plurality of seal valves 240. Each seal valve in the plurality of seal valves 240 may be similar to a restrictor valve in the plurality of restrictor valves 220, with the exception of the orifice (e.g., orifice 232 of restrictor valve 230) and a keying feature, as described further herein. In various embodiments, by having restrictor valves 220 and seal valves 240, the orifices of the restrictor valves may be sized larger than if all of the valves were restrictor valves. In this regard, by having restrictor valves 220 and seal valves 240 instead of only restrictor valves, the orifice of the restrictor valves 220 may be more manufacturable, in various embodiments. However, although described herein with restrictor valves 220 and seal valves 240, a rebound valve system with only restrictor valves 220 is within the scope of this disclosure, and would provide fewer types of components to manufacture, in accordance with various embodiments.

In various embodiments, the rebound valve system 160 may further comprise a retaining ring 250 and the snubber 210 comprises a circumferential receptacle 214. In various embodiments, the retaining ring 250 is disposed in the circumferential receptacle 214 of the snubber, and each restrictor valve in the plurality of restrictor valves 220 and each seal valve in the plurality of seal valves 240 may be pivotably coupled to the retaining ring 250. In this regard, each restrictor valve in the plurality of restrictor valves 220 and each seal valve in the plurality of seal valves 240 is configured to pivot about a centerline of the retaining ring 250. In various embodiments, by pivotably coupling the restrictor valves 220 and the seal valves 240, a significantly lower force of oil may open the valves 220, 240, relative to a typical rebound valve system that is pressure activated (e.g., where a whole ring levitates from the pressure differential to open the seal).

In various embodiments, the rebound valve system 160 further comprises a cylindrical seal 260. The cylindrical seal 260 is configured to seal rebound chamber 136 from primary chamber 132 in FIG. 1, in accordance with various embodiments.

Figure 4:
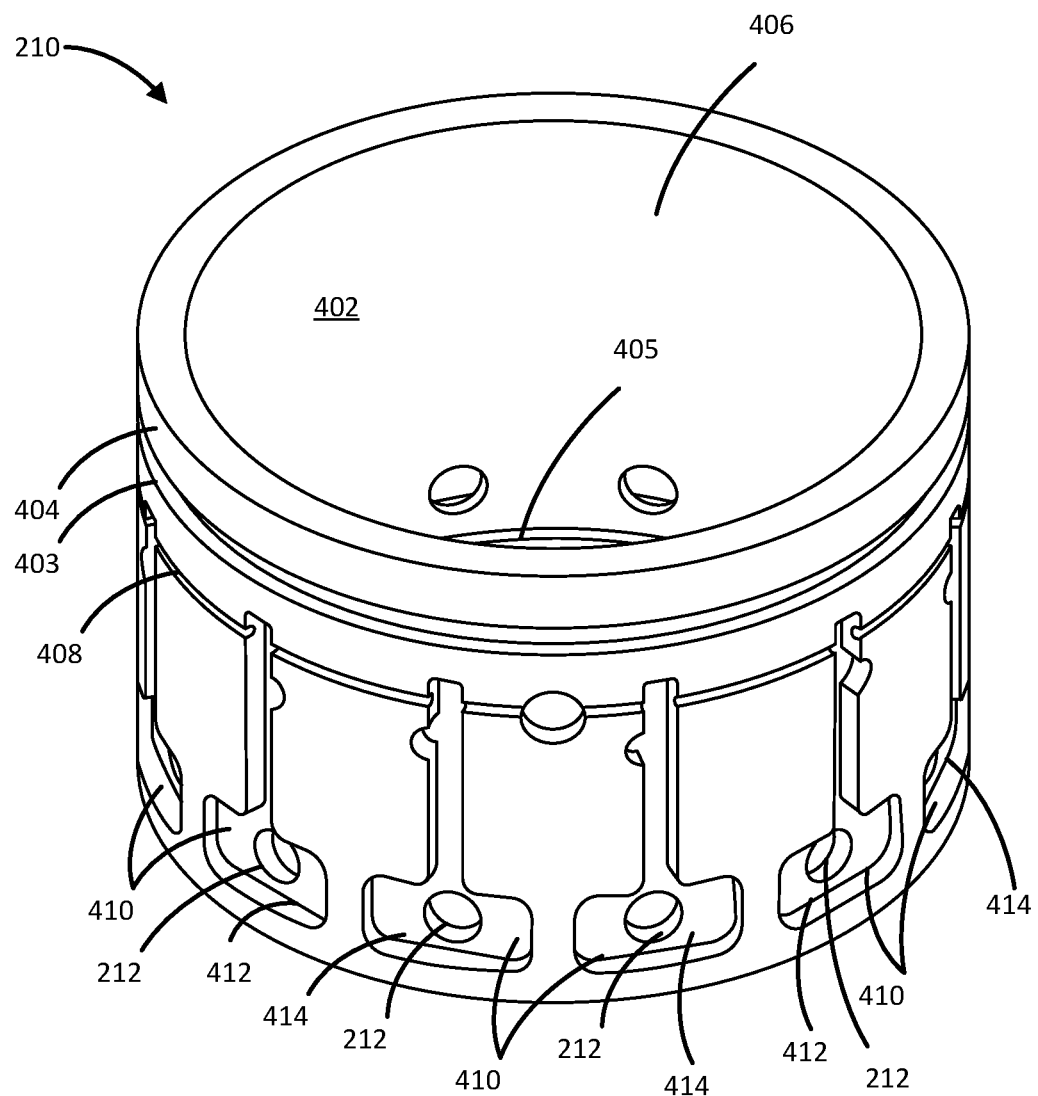
FIG. 4 illustrates a perspective view of a snubber, in accordance with various embodiments.

Referring now to FIG. 4, a perspective view of a snubber 210 for use in the rebound valve system of FIGS. 1-3 is illustrated, in accordance with various embodiments. The snubber 210 comprises a snubber body 402 and a plurality of valve receptacles 410. In various embodiments, the snubber body 402 is annular in shape having an outer diameter surface 404 and an inner diameter surface 406. In various embodiments, the plurality of valve receptacles 410 are disposed in the outer diameter surface 404 of the snubber body 402. In various embodiments, each valve receptacle in the plurality of valve receptacles 410 comprises a recess disposed in the outer diameter surface 404 of the snubber body 402.

In various embodiments, each valve receptacle in the plurality of valve receptacles 410 may be a complimentary shape of a respective restrictor valve in the plurality of restrictor valves 220 or seal valve in the plurality of seal valves 240 from FIG. 3. In this regard, a snubber assembly may include the seal valves and restrictor valves disposed in the plurality of valve receptacles 410.

In various embodiments, the plurality of valve receptacles 410 may include a plurality of restrictor valve receptacles 412 and a plurality of seal valve receptacles 414. In various embodiments, each restrictor valve receptacle in the plurality of restrictor valve receptacles 412 may be configured to receive a respective restrictor valve in the plurality of restrictor valves 220 from FIGS. 2-3. Similarly, each seal valve receptacle in the plurality of seal valve receptacles 414 may be configured to receive a respective seal valve in the plurality of seal valves 240 from FIG. 3. In this regard, each valve receptacle in the plurality of valve receptacles 410 may contain a keying feature, such as a specifically oriented recess, to ensure a respective seal valve or a respective restrictor valve is appropriately disposed in the respective valve receptacle. In various embodiments, each receptacle in the plurality of valve receptacles 410 have a flat bottom substantially perpendicular to a radius of the snubber body 402. In various embodiments, the plurality of valve receptacles may be sized and configured not to restrict free flow into the rebound chamber 136 from FIG. 2.

In various embodiments the snubber 210 further comprises a retaining groove 408 disposed in the outer diameter surface 406 of the snubber body 402. The retaining groove 408 may extend circumferentially around the snubber body 402. The retaining groove 408 may be configured to receive a retaining band as described further herein.

In various embodiments, the snubber 210 further comprises a first seal groove 403 and a second seal groove 405. The first seal groove 403 is disposed on the outer diameter surface 406. The second seal groove 405 is disposed on the inner diameter surface 404 of the snubber body 402. The first seal groove 403 extends circumferentially around the outer diameter surface 406 of the snubber body. Similarly, the second seal groove 405 extends circumferentially around the inner diameter surface 404 of the snubber body 402.

In various embodiments, the snubber 210 further comprises the plurality of radial apertures 212. Each radial aperture in the plurality of radial apertures is disposed radially through the snubber body 402 and disposed in a respective blade pocket of a respective valve receptacle in the plurality of valve receptacles 410. In this regard, the plurality of radial apertures 212 are configured to interface with a respective valve in the plurality of valves as disclosed further herein.

Figure 5A:
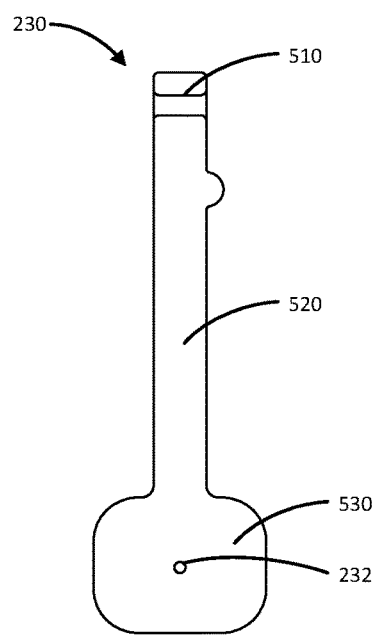
FIG. 5A illustrates a front view of a restrictor valve, in accordance with various embodiments.
Figure 5B:
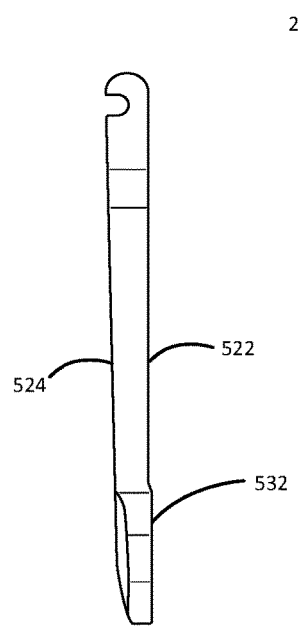
FIG. 5B illustrates a side view of a restrictor valve, in accordance with various embodiments.
Figure 5C:
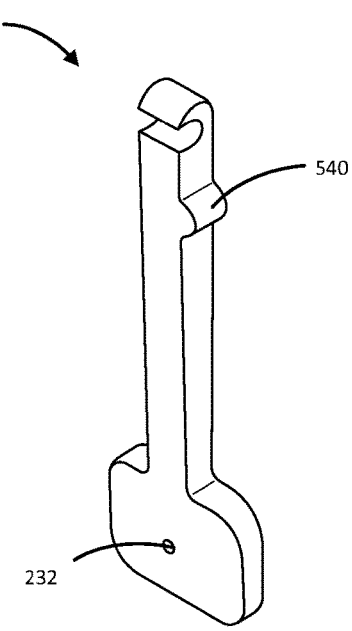
FIG. 5C illustrates a perspective view of a restrictor valve, in accordance with various embodiments.

Referring now to FIGS. 5A-5C, a front view (FIG. 5A), a side view (FIG. 5B), and a perspective view (FIG. 5C) of a restrictor valve 230 for use in a rebound valve system 160 of FIGS. 1-3 is illustrated, in accordance with various embodiments. In various embodiments, the restrictor valve 230 includes a grip 510, a shaft 520, and a blade 530. In various embodiments, the grip 510 may provide a pivot point to open and close the restrictor valve 230. In various embodiments, the grip 510 may comprise a hook. Although illustrated as comprising a hook, any grip arrangement is within the scope of this disclosure, such as a tee head, a spherical joint, or the like.

In various embodiments, the shaft 520 extends from the grip 510 to the blade 530. In various embodiments, the shaft 520 may help maintain a beneficial paddle orientation in a valve open position. The length of the shaft 520 may vary based on the application. In various embodiments, as the shaft length increases, the angle traveled between a valve open position and a valve closed position may decrease. In various embodiments, as the travel angle decreases, a sensitivity of the restrictor valve 230 to pressure differentials and flow will increase and response time will decrease.

In various embodiments, the blade 530 is configured to react to differential pressures resulting from a force from the flow into or out of the rebound chamber 136 from FIGS. 1 and 2. In various embodiments, the blade 530 includes a flat surface 532 configured to interface with a mating surface of a respective restrictor valve receptacle in the plurality of restrictor valve receptacles 412 from FIG. 4. In this regard, the blade 530 is configured to partially cover an aperture disposed through the snubber (e.g., radial aperture 213 in FIG. 2).

In various embodiments, the shaft 520 includes a first side surface 522 and a second side surface 524. In various embodiments, the flat surface 532 of the blade 530 protrudes outward slightly from the first side surface 522. In this regard, the flat surface 532 of the blade 530 is configured to contact the recess of a respective valve receptacle prior to any other part of the restrictor valve 230. In various embodiments, the second side surface 524 is disposed opposite the first side surface 522 of the shaft 520. Although shaft 520 is illustrated as being cubic in shape, the shaft 520 is not limited in this regard and may comprise other shapes, such as cylindrical, or the like.

In various embodiments, the blade 530 of the restrictor valve 230 includes the orifice 232 disposed therethrough. The orifice 232 is sized and configured based on a desired amount of metering desired during a strut extension of a strut assembly (e.g., shock strut assembly 100 from FIG. 1).

In various embodiments, the restrictor valve 230 includes a keying feature, such as a protrusion 540. Although illustrated as a protrusion 540, any keying feature known in the art may be utilized. In various embodiments, the keying feature (e.g., protrusion 540) may extend outward from a third side surface 526 of the shaft 520. The third side surface 526 may extend from the first side surface 522 to the second side surface 524.

Figure 6:
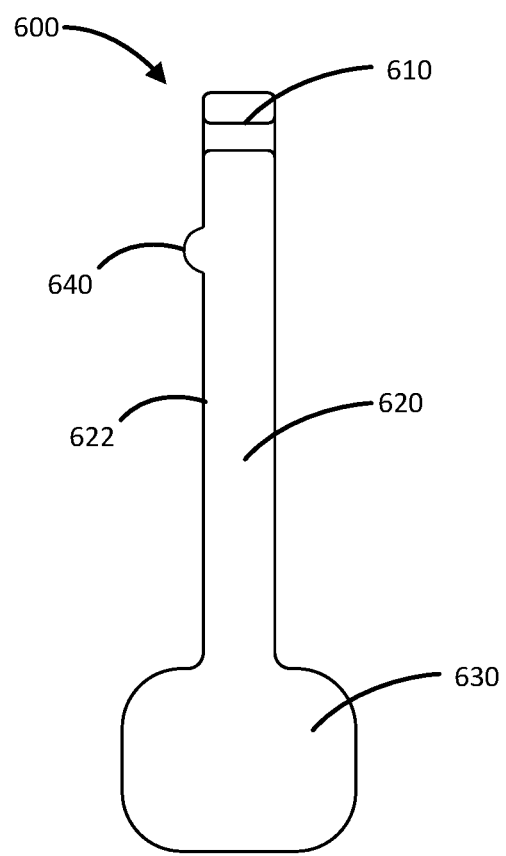
FIG. 6 illustrates a front view of a seal valve in accordance with various embodiments.

Referring now to FIG. 6, a front view of a seal valve 600 of the plurality of seal valves 240 from FIG. 3 for use in the rebound valve system 160 from FIGS. 1-3 is illustrated, in accordance with various embodiments. The seal valve 600 includes a grip 610, a shaft 620 and a blade 630. The grip 610 is in accordance with the grip 510 of the restrictor valve 230 discussed above. Similarly, the shaft 620 is in accordance with the shaft 520 of the restrictor valve 500 discussed above. The blade 630 is in accordance with the blade 530 of the restrictor valve 500 discussed above, with the exception of the orifice 232 of restrictor valve 500. In various embodiments, blade 630 does not include an orifice. In this regard, during extension of a strut cylinder 110 from FIG. 1, the blade 630 is configured to at least partially seal a respective radial aperture of the snubber and/or the strut piston of the strut assembly. In various embodiments, the seal valve 600 includes a keying feature that is different from the keying feature (e.g., protrusion 540) of restrictor valve 500 from FIG. 5. For example, the seal valve 600 may include a protrusion 640 on a side surface 622 of the shaft 620. The side surface 622 may be a different side surface of shaft 620 than third side surface 526 of restrictor valve 500 from FIG.

5. In this regard, mis-assembly of a restrictor valve 500 from FIG. 5 and a seal valve 600 may be prevented.

Figure 7:
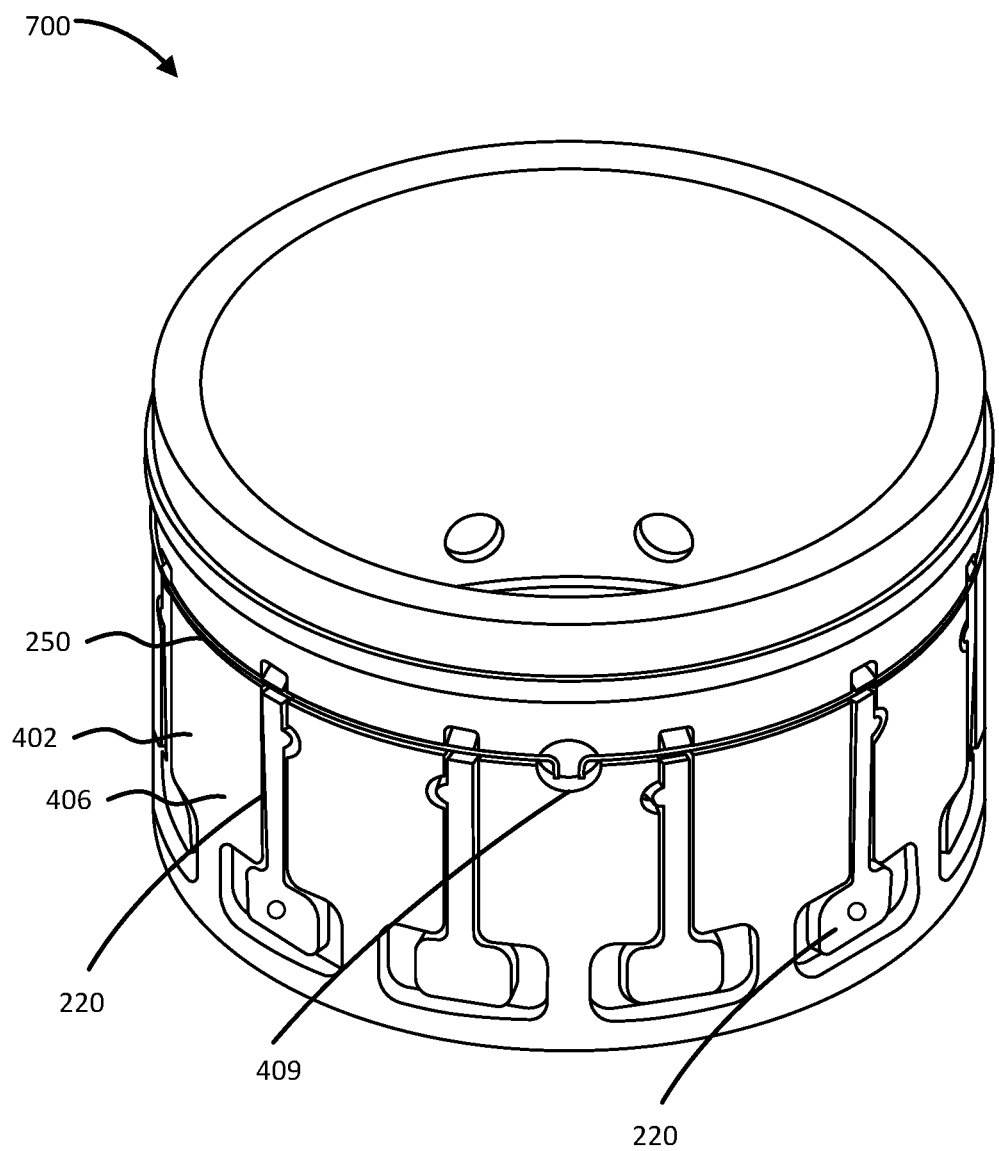
FIG. 7 illustrates a snubber assembly in accordance with various embodiments.

Referring now to FIG. 7, a perspective view of a snubber assembly 700 for use in a rebound valve system 160 from FIGS. 1-2 is illustrated, in accordance with various embodiments. The snubber assembly 700 comprises the snubber 210 (as illustrated in FIG. 4) and a plurality of restrictor valves 220. In various embodiments, each restrictor valve in the plurality of restrictor valves 220 are in accordance with the restrictor valve 230 (as illustrated in FIG. 5).

In various embodiments, each restrictor valve in the plurality of restrictor valves 220 are moveably coupled to the snubber 210 by any method known in the art. Although illustrated as being pivotably coupled to the snubber 210, the present disclosure is not limited in this regard. For example, the plurality of restrictor valves 220 may be slidingly coupled to the snubber 210, or the like.

In various embodiments, the snubber assembly 700 further comprises a retaining ring 250. The retaining ring 250 may comprise an annular shaped band, or the like. The retaining band may be disposed in the retaining groove 408 of the snubber 210 from FIG. 4. In various embodiments, the snubber 210 further comprises an anti-rotation pocket 409 disposed in the outer diameter surface 406 of the snubber body 402. The anti-rotation pocket 409 is configured to receive a first end and a second end of the retaining ring 250. In this regard, the anti-rotation pocket 409 is configured to prevent rotation of retaining ring 250 during operation of the snubber assembly 700.

Figure 8:
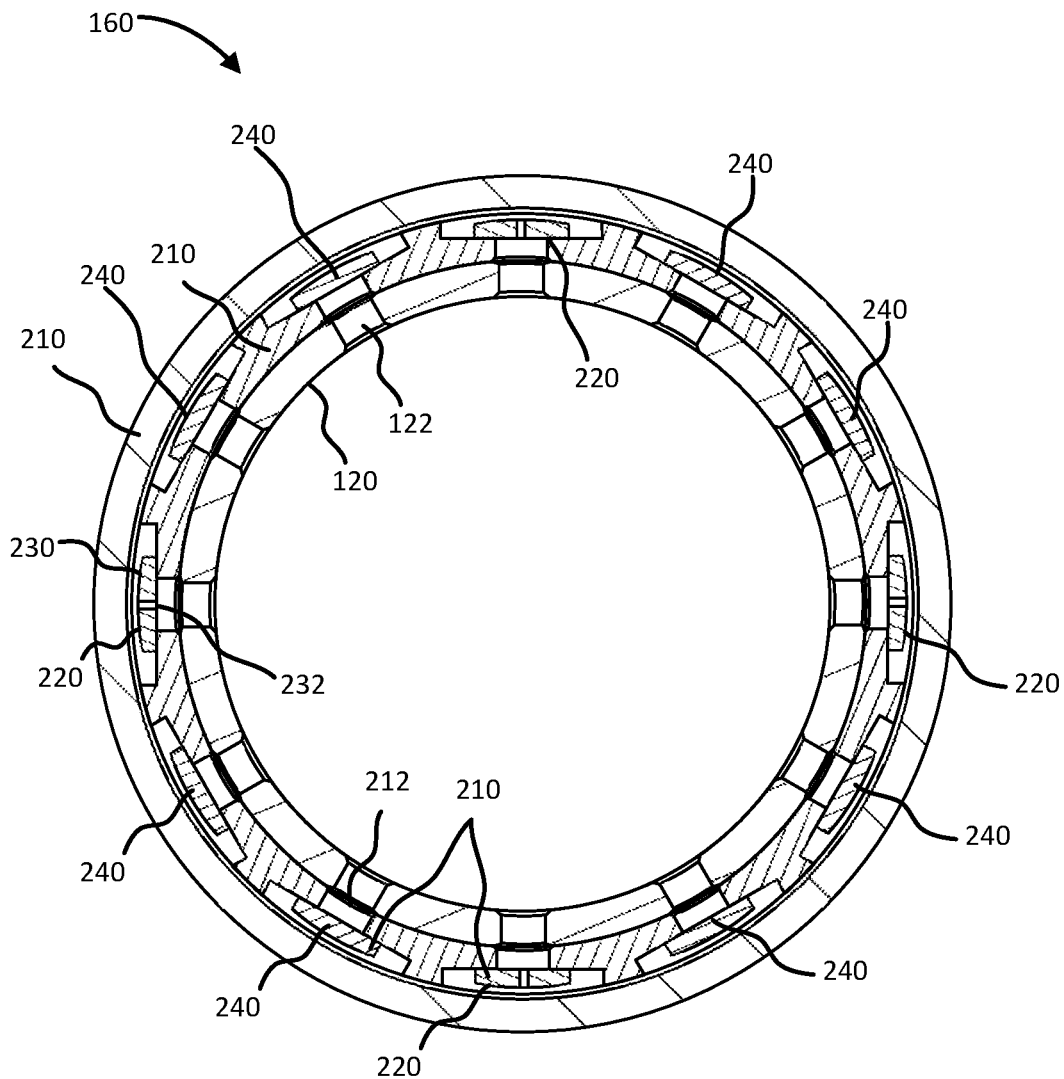
FIG. 8 illustrates a cross-sectional view along section line B-B from FIG. 1, in accordance with various embodiments.

Referring now to FIG. 8, a cross-sectional view of shock strut assembly 100 along section line B-B from FIG. 1 during strut extension is illustrated, in accordance with various embodiments. In various embodiments, the rebound valve system 160 is configured to dampen the strut extension. In this regard, oil may flow from the rebound chamber 136 back through an orifice 232 of a respective restrictor valve 230 in the plurality of restrictor valves 220 through a respective radial aperture of the plurality of radial apertures 212 of the snubber 210 and a respective radial aperture of the plurality of radial apertures 122 of the strut piston 120. In various embodiments, the metered oil flow during strut extension may dampen the strut extension. The amount of oil that is metered may be a design choice and vary based on a desired damping level and desired velocity of the strut extension.

In various embodiments, each restrictor valve in the plurality of restrictor valves 220 may be equidistant, measured in a circumferential direction, from an adjacent restrictor valve in the plurality of restrictor valves 220. For example, if there are four restrictor valves, each restrictor valve may be approximately 90 degrees from an adjacent restrictor valve in the plurality of restrictor valves 220. In this regard, the metered flow during strut extension may be evenly distributed circumferentially about the shock strut assembly 100.

In various embodiments, by having a plurality of restrictor valves 220, if one of the restrictor valves is clogged from debris, or the like, the remaining restrictor valves in the plurality of restrictor valves 220 may still function as intended. In this regard, the rebound valve system 160 of the shock strut assembly 100 may be more robust than typical rebound valve systems.

In various embodiments, during the strut extension, the plurality of seal valves 240 may seal a respective radial aperture in the plurality of radial apertures 212 of the snubber 210. In this regard, the sizing of the orifice 232 of the restrictor valve 230 may be more manageable than if all valves in the plurality of valves included orifices. Although illustrated as including four restrictor valves and eight seal valves, the present disclosure is not limited in this regard. In other words, there would not be a constraint on the total number of apertures. In various embodiments, all of the valves may be restrictor valves 230, or a ratio of seal valves to restrictor valves may be increased or decreased and be within the scope of this disclosure.

Figure 9:
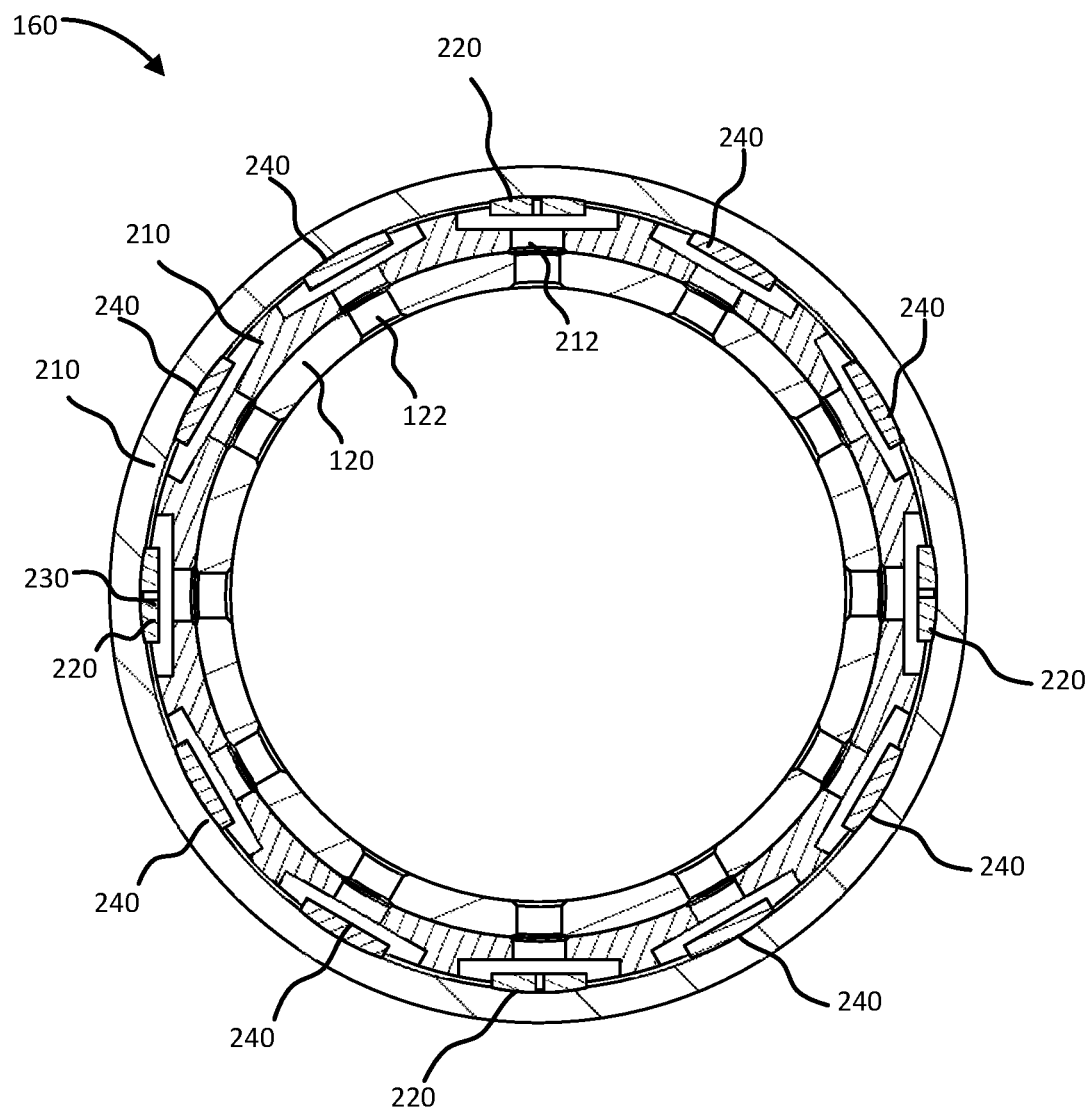
FIG. 9 illustrates a cross-sectional view along section line B-B from FIG. 1, in accordance with various embodiments.

Referring now to FIG. 9, a cross-sectional view of shock strut assembly 100 along section line B-B from FIG. 1 during strut compression is illustrated, in accordance with various embodiments. During strut compression, a free flow of oil into the rebound chamber 136 from FIG. 2 may be desired. In this regard, oil may flow from the primary chamber 132 through the plurality of radial apertures 122 of the strut piston 120 and the plurality of radial apertures 212 of the snubber 210, lightly pivot the plurality of valves 220, 240 out of the way, and flow into the rebound chamber 136 from FIG. 2.

Figure 10:
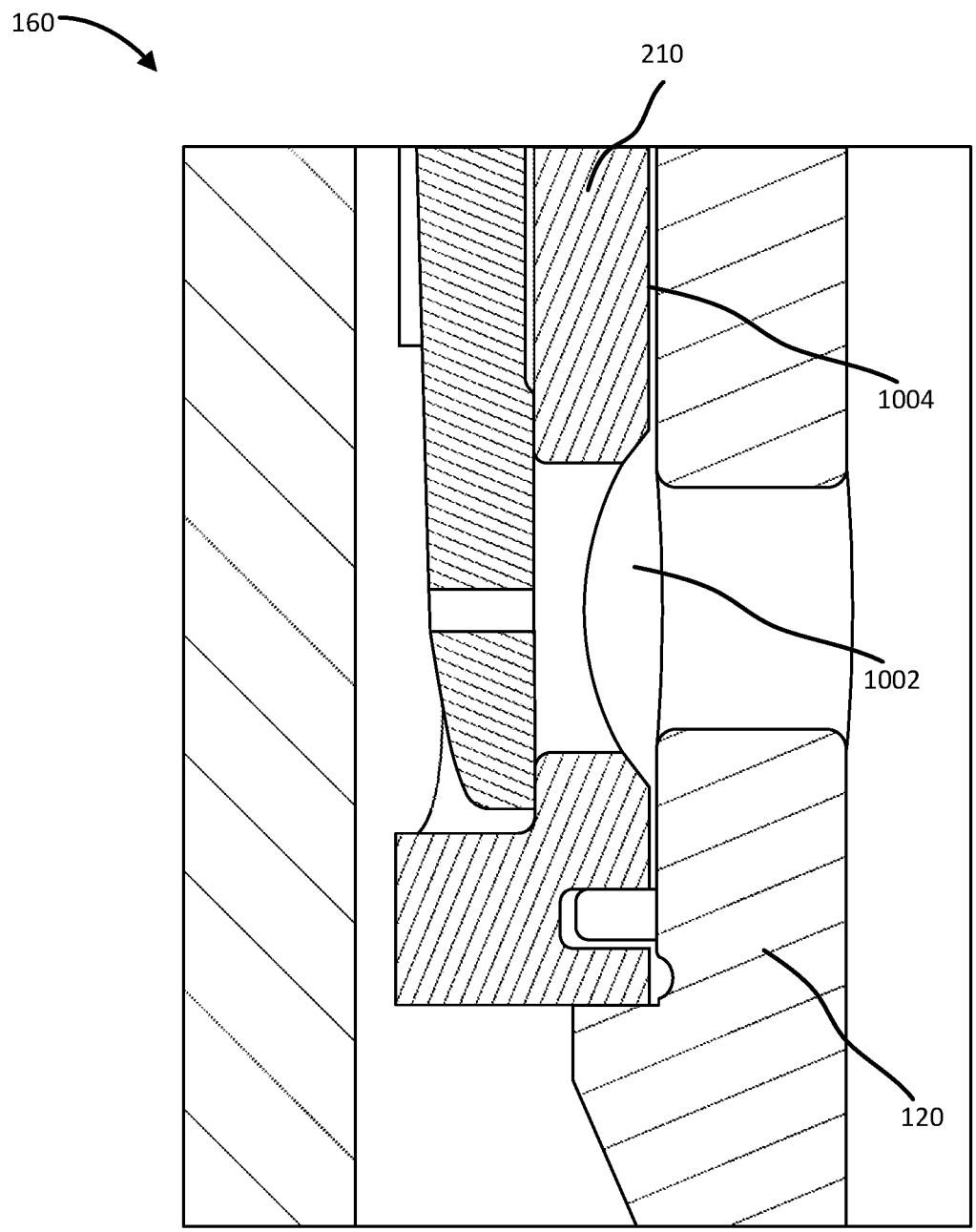
FIG. 10 illustrates a cross-sectional view of a portion of a rebound valve system, in accordance with various embodiments.

Referring now to FIG. 10, a cross-section view of a portion of a rebound valve system 160 is illustrated, in accordance with various embodiments. In various embodiments, the snubber 210 may further comprise a flow in groove 1002 disposed in an inner diameter surface 1004 of the snubber 210. The flow in groove 1002 may extend circumferentially around the inner diameter surface 1004. In this regard, a different number of radial apertures in the strut piston 120 and the snubber 210 may be utilized as long as a minimum flow area is maintained. In various embodiments, the groove 1002 may eliminate a snubber from having to be clocked to a certain angle relative to strut piston 120 during assembly. However, the groove 1002 may add some additional flow restriction.

Figure 11:
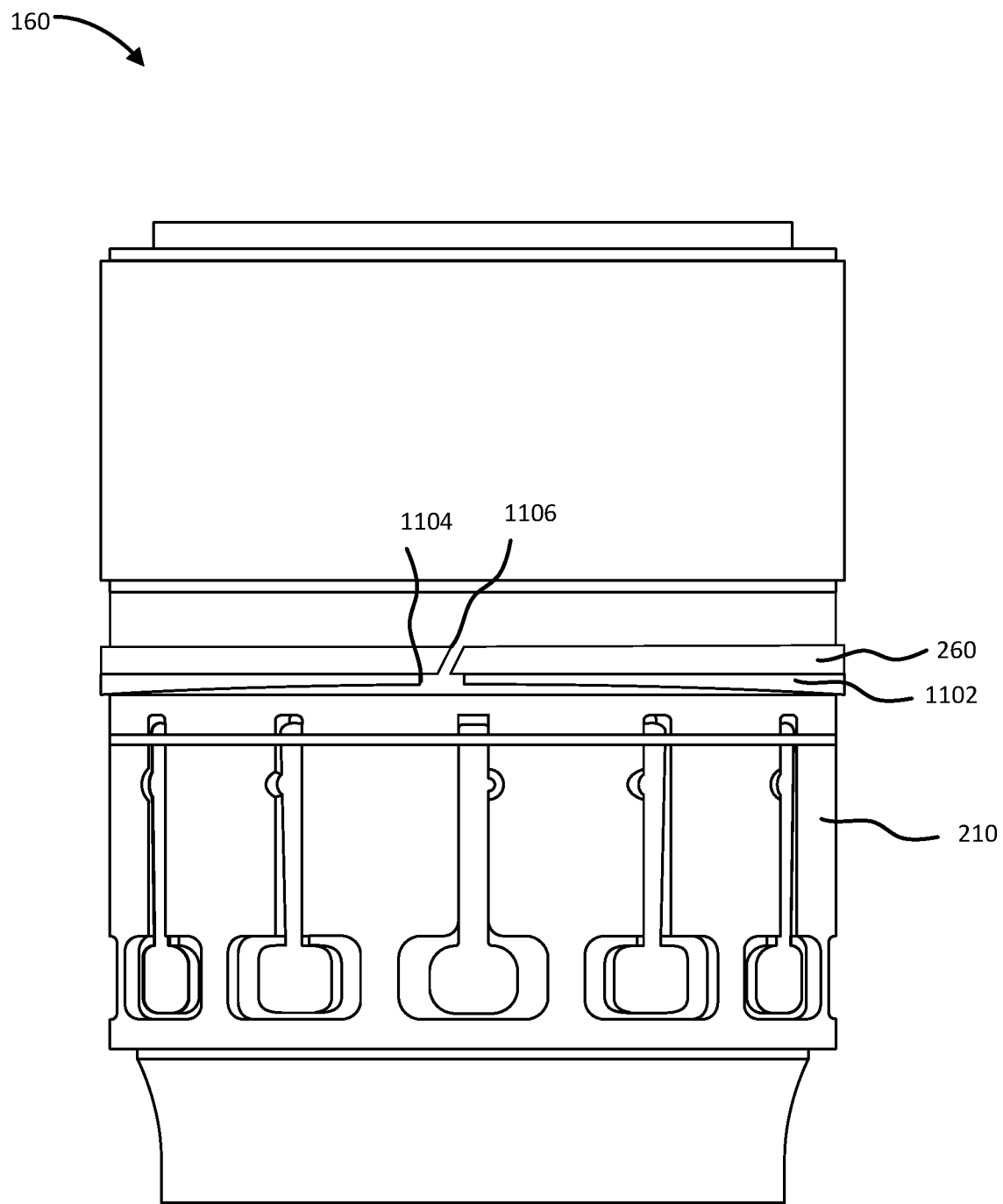
FIG. 11 illustrates a side view of a portion of a shock strut assembly with a rebound valve system, in accordance with various embodiments.

Referring now to FIG. 11, a side view of a portion of a shock strut assembly having a rebound valve system 160 in accordance with various embodiments is illustrated. In various embodiments, the rebound valve system 160 may further comprise a ramp split ring 1102 disposed axially adjacent to the cylindrical seal 260.

In various embodiments, the ramp split ring may be configured to vent and/or purge gas that becomes trapped in the rebound chamber (e.g., rebound chamber 136 from FIG. 1). In various embodiments, the ramp split ring 1102 includes a gap 1104. In various embodiments, the gap 1104 may allow gas to be purged from the rebound chamber (e.g., rebound chamber 136 from FIG. 1) as long as all the gas migrates along the annular space to the gap 1104.

Figure 12:
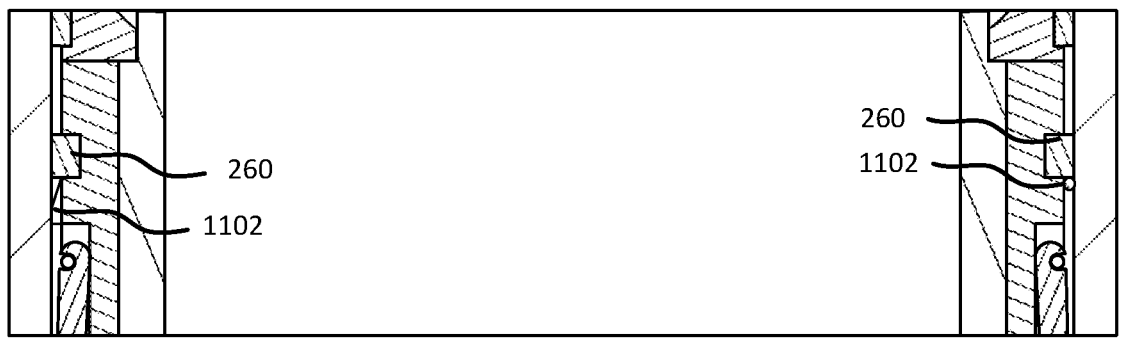
FIG. 12 illustrates a cross-sectional view of a portion of a rebound valve system, in accordance with various embodiments.

In various embodiments, the cylindrical seal 260 and the ramp split ring 1102 may be clocked to the snubber 210 to align a gap 1106 of the cylindrical seal 260 and the gap 1106 of the ramp split ring 1102. In this regard, the gas may eventually travel to the location of the gap 1104, in accordance with various embodiments. In various embodiments, the ramp split ring 1102 may be configured to optimize effectiveness, gaps between the strut cylinder 110 from FIG. 1 and the snubber 210 may be minimized. In various embodiments, the ramp split ring 1102 acts as a guide ring. In various embodiments, the ramp split ring 1102 is further illustrated in a cross-sectional view in FIG. 12.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system.

However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A snubber assembly, comprising:
a snubber having a snubber body with an inner diameter surface and an outer diameter surface, the snubber including a plurality of valve receptacles disposed in the outer diameter surface, the snubber including a plurality of radial apertures disposed through the snubber body, each radial aperture in the plurality of radial apertures disposed in a respective valve receptacle in the plurality of valve receptacles;
a plurality of restrictor valves, each restrictor valve in the plurality of restrictor valves disposed in a respective valve receptacle in the plurality of valve receptacles, each restrictor valve in the plurality of restrictor valves including an orifice disposed through a blade; and
a plurality of seal valves, each seal valve disposed in a portion of a first valve receptacle in the plurality of valve receptacles, wherein each seal valve in the plurality of seal valves includes a first keying feature and each restrictor valve in the plurality of restrictor valves includes a second keying feature to prevent mis-assembly.

2. The snubber assembly of claim 1, further comprising a retaining ring, wherein the retaining ring couples the plurality of restrictor valves to the snubber body.

3. The snubber assembly of claim 2, wherein the plurality of restrictor valves are configured to pivot about the retaining ring.

4. The snubber assembly of claim 1, wherein the plurality of restrictor valves are disposed in a remaining portion of the plurality of valve receptacles.

5. The snubber assembly of claim 1, wherein each restrictor valve in the plurality of restrictor valves includes a grip, the blade, and a shaft extending from the grip to the blade.

6. A rebound valve system, comprising:
a strut piston defining an oil chamber, the strut piston including a plurality of radial apertures disposed radially through the strut piston;
a strut cylinder configured to receive the strut piston, a rebound chamber defined between the strut piston and the strut cylinder;
a plurality of restrictor valves disposed circumferentially around the strut piston, each restrictor valve in the plurality of restrictor valves configured to open during a compression of the strut piston relative to the strut cylinder, and each restrictor valve configured to at least partially close during an extension of the strut piston; and
a plurality of seal valves, wherein each seal valve in the plurality of seal valves is configured to seal a respective radial aperture in the plurality of radial apertures during the extension of the strut piston, wherein each seal valve in the plurality of seal valves includes a first keying feature and each restrictor valve in the plurality of restrictor valves includes a second keying feature to prevent mis-assembly.

7. The rebound valve system of claim 6, wherein each restrictor valve in the plurality of restrictor valves includes an orifice disposed through a blade.

8. The rebound valve system of claim 7, wherein a fluid is configured to flow from the rebound chamber through the orifice and a respective radial aperture in the plurality of radial apertures into a primary chamber during the extension of the strut piston.

9. The rebound valve system of claim 8, wherein a flow of fluid is configured to pivot the plurality of restrictor valves about a pivot axis to open the plurality of restrictor valves during the compression of the strut piston.

10. The rebound valve system of claim 6, further comprising a snubber disposed between the strut cylinder and the strut piston.

11. The rebound valve system of claim 10, wherein the plurality of restrictor valves are disposed between the snubber and the strut cylinder.

12. A shock strut assembly, comprising:
 a strut cylinder;
 a strut piston, the strut cylinder configured to receive the strut piston, the strut piston defining an oil chamber; and
 a snubber assembly disposed between the strut cylinder and the strut piston, the snubber assembly comprising:
  a snubber having a plurality of valve receptacles disposed in an outer diameter surface of the snubber;
  a plurality of restrictor valves, each restrictor valve disposed in a respective valve receptacle in the plurality of valve receptacles, each restrictor valve in the plurality of restrictor valves configured to open during a compression of the strut piston relative to the strut cylinder, and each restrictor valve configured to at least partially close during an extension of the strut piston; and
  a plurality of seal valves, each seal valve disposed in a portion of a first valve receptacle in the plurality of valve receptacles, wherein each seal valve in the plurality of seal valves includes a first keying feature and each restrictor valve in the plurality of restrictor valves includes a second keying feature to prevent mis-assembly.

13. The shock strut assembly of claim 12, wherein each restrictor valve includes a grip, a blade, and a shaft extending from the grip to the blade, and each restrictor valve is configured to pivot about the grip.

14. The shock strut assembly of claim 12, wherein the plurality of restrictor valves are disposed in a remaining portion of the plurality of valve receptacles.

15. The shock strut assembly of claim 12, further comprising a retaining ring, wherein the plurality of restrictor valves are coupled to the retaining ring, and wherein the retaining ring is coupled to the snubber.

16. The shock strut assembly of claim 12, wherein a primary chamber is in fluid communication with a rebound chamber through the plurality of restrictor valves, the rebound chamber defined between the strut piston and the strut cylinder.

17. The shock strut assembly of claim 12, wherein a flow of fluid is configured to pivot the plurality of restrictor valves about a pivot axis to open the plurality of restrictor valves during the compression of the strut piston.

* * * * *